(12) United States Patent
Taga et al.

(10) Patent No.: US 7,088,927 B2
(45) Date of Patent: Aug. 8, 2006

(54) OPTICAL RECEIVING APPARATUS AND METHOD

(75) Inventors: Hidenori Taga, Tokyo (JP); Koji Goto, Tokyo (JP)

(73) Assignee: KDDI Corporation, Tokyo (JP)

( * ) Notice: Subject to any disclaimer, the term of this patent is extended or adjusted under 35 U.S.C. 154(b) by 85 days.

(21) Appl. No.: 10/783,227

(22) Filed: Feb. 19, 2004

(65) Prior Publication Data

US 2004/0165894 A1 Aug. 26, 2004

Related U.S. Application Data

(62) Division of application No. 10/460,895, filed on Jun. 12, 2003, now abandoned, which is a division of application No. 09/546,917, filed on Apr. 11, 2000, now abandoned.

(30) Foreign Application Priority Data

May 25, 1999 (JP) .................... 11-145416

(51) Int. Cl.
*H04B 10/06* (2006.01)
*H03K 5/125* (2006.01)

(52) U.S. Cl. .................... 398/202; 398/208

(58) Field of Classification Search ............... 375/317, 375/318, 319; 327/60, 72
See application file for complete search history.

(56) References Cited

U.S. PATENT DOCUMENTS

| | | | |
|---|---|---|---|
| 4,481,676 A | 11/1984 | Eumurian et al. | |
| 4,823,360 A | 4/1989 | Tremblay et al. | |
| 5,001,726 A | 3/1991 | Kawai et al. | |
| 5,274,674 A | 12/1993 | Lafon | |
| 5,585,954 A | 12/1996 | Taga et al. | |
| 5,652,767 A * | 7/1997 | Kiyonaga et al. | ............ 375/317 |
| 6,351,322 B1 | 2/2002 | Ransford et al. | |
| 6,496,552 B1 * | 12/2002 | Tomofuji et al. | ............ 375/373 |
| 6,822,214 B1 * | 11/2004 | Han et al. | ............... 250/214 R |

FOREIGN PATENT DOCUMENTS

| | | | |
|---|---|---|---|
| EP | 0 113 082 A2 | | 7/1984 |
| JP | 56-90634 | | 7/1981 |
| JP | 03013036 A | * | 1/1991 |
| JP | 07046203 A | * | 2/1995 |
| JP | 2003110631 A | * | 4/2003 |

OTHER PUBLICATIONS

European Search Report dated Aug. 8, 2001 corresponding to European patent application No. EP 00 10 8680.
Patent Abstract of Japan, Publication No. 56,090634, published Jul. 22, 1981.
N.S. Bergano et al., "Margin Measurements in Optical Amplifier Systems", IEEE Photonics Technology Letters, vol. 5, No. 3, Mar. 1993, pp. 304-306.

* cited by examiner

*Primary Examiner*—Kenneth Vanderpuye
*Assistant Examiner*—David S. Kim
(74) *Attorney, Agent, or Firm*—Christie, Parker and Hale, LLP

(57) ABSTRACT

An optical receiving apparatus includes a signal brancher for branching an optical input signal received from an optical transmission line into a first signal component and a second signal component, a clock extractor for extracting a clock having an amplitude from the second signal component, and a discriminator for discriminating the first signal component. The apparatus also includes a threshold controller for generating a discrimination threshold for the discriminator according to a relationship between the extracted clock amplitude and a bit error rate to which the extracted clock amplitude corresponds.

7 Claims, 14 Drawing Sheets

OPTICAL RECEIVING APPARATUS AND METHOD

CROSS-REFERENCE TO RELATED APPLICATION(S)

This application is a divisional of U.S. application Ser. No. 10/460,895, filed Jun. 12, 2003, now abandoned, which is a divisional of U.S. application Ser. No. 09/546,917, filed Apr. 11, 2000, now abandoned, which claims priority of Japanese patent Application No. Heisei 11 (1999) 145416, filed May 25, 1999.

FIELD OF THE INVENTION

This invention relates to an optical receiving apparatus and method.

BACKGROUND OF THE INVENTION

In an optical transmission system, transmission characteristics of the transmission system are measured at the time of installation and a discrimination threshold of a received signal light at a receiving terminal is determined according to the obtained result. Thereafter, a signal value of the received signal light is discriminated with the discrimination threshold.

As mentioned above, in conventional systems, the discrimination thresholds are fixed. However, it has been understood that the transmission characteristics of the optical transmission line fluctuate with time and, consequently, the optimum discrimination threshold of the received signal light varies as well. FIG. 18 shows a measured result of a time variation of an optimum discrimination threshold. The vertical line and horizontal line show the optimum discrimination threshold and elapsed time respectively.

If the discrimination threshold of the received signal light is remained at the fixed value in spite of such variation, a bit error rate (Q value) becomes deteriorated.

SUMMARY OF THE INVENTION

An object of the present invention is to provide an optical receiving apparatus and method for stably discriminating a received signal regardless of a time variation of transmission characteristics.

Another object of the present invention is to provide an optical receiving apparatus and method for adaptively adjusting a discrimination threshold of a received signal light according to a variation of transmission characteristics. In order to achieve the above-mentioned objects, in the invention, transmission characteristics of an optical transmission line are evaluated according to an input signal from an optical transmission line and then a discrimination threshold of the received signal is controlled to become an optimum value according to the evaluated result. Therefore, the reception characteristics can be controlled to keep the optimum state always or practically all the time responding to the variation of the transmission characteristics of the optical transmission line.

The transmission characteristics of the optical transmission line can be evaluated, for example, from the number of errors of the received signal. The discrimination threshold of the signal is varied within a predetermined range, then an optimum discrimination threshold is determined from the evaluated results of the transmission characteristics at the respective discrimination thresholds, and the optimum discrimination threshold is generated for a predetermined period thereafter. Consequently, the satisfactory reception characteristics can be automatically selected responding to the variation of the transmission characteristics.

The transmission characteristics of the optical transmission line also can be evaluated using another method in which the received signal is discriminated by a plurality of fixed thresholds different from one another and then the error numbers among the obtained respective results are compared to calculate a standard deviation of at least one of mark and space sides. Since it is unnecessary to scan the discrimination thresholds, the optimum value can be rapidly determined.

Also, the transmission characteristics of the optical transmission line can be evaluated using the other method in which the received signal is discriminated by a plurality of fixed thresholds different from one another and then the error numbers among the obtained respective results are compared to estimate a distribution of the error numbers corresponding to the discrimination thresholds. In this case, the discrimination threshold having the minimum error number in the estimated error number distribution is determined as the optimum value. Since it is unnecessary to scan the discrimination value, the optimum value can be rapidly determined.

Furthermore, the transmission characteristics of the optical transmission line can be evaluated with amplitude of a clock extracted from the received signal. In this case, the optimum discrimination threshold is determined according to the amplitude of the extracted clock. Since it is unnecessary to scan the discrimination thresholds, the optimum value can be rapidly determined.

BRIEF DESCRIPTION OF THE DRAWINGS

The above and other, objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
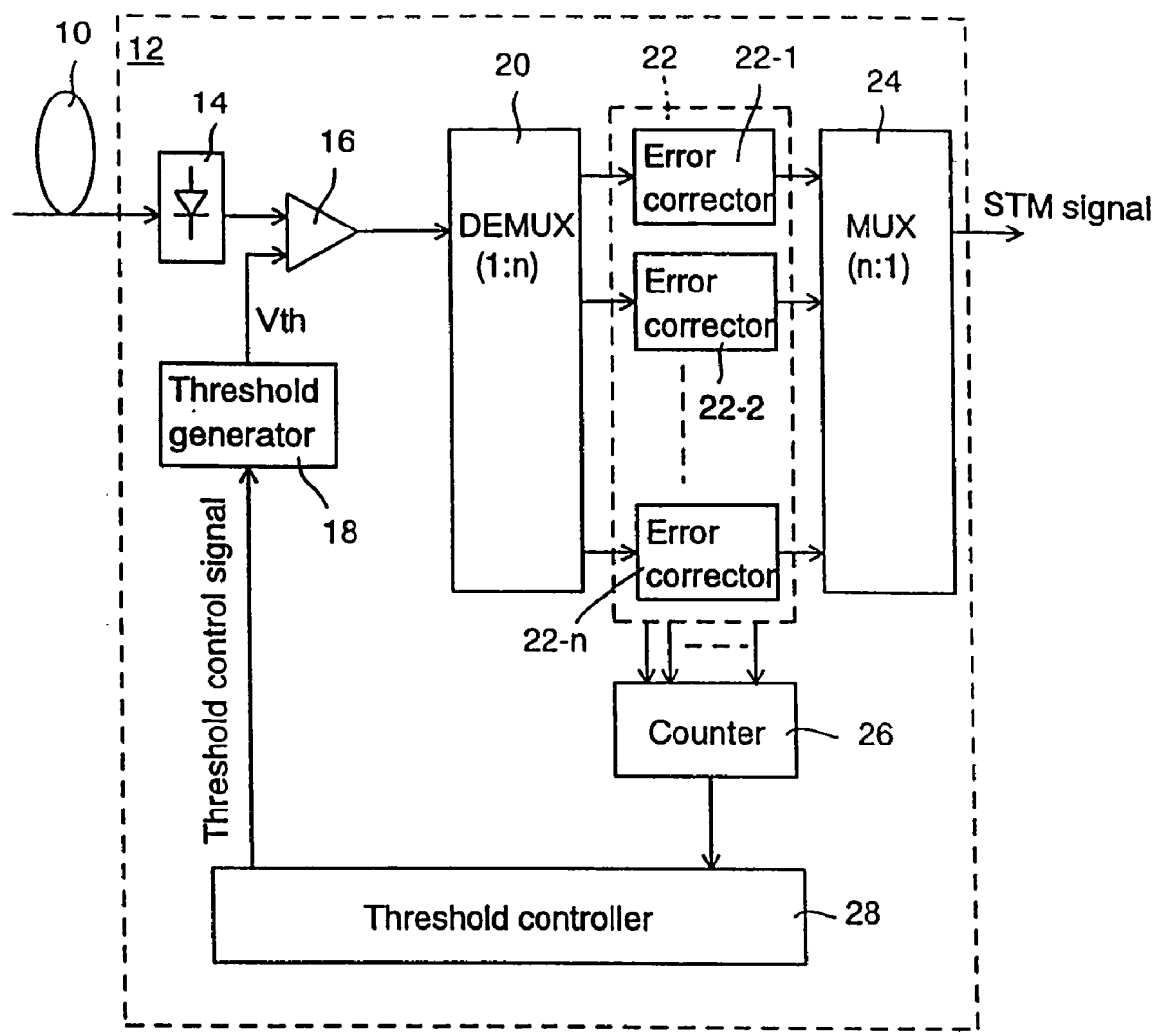
FIG. 1 is a schematic block diagram according to a first embodiment of the invention.

FIG. 1 is a schematic block diagram of an optical reception terminal in which a first embodiment of the invention is installed.

A signal light enters from an optical transmission line 10 to an optical reception terminal 12 of the embodiment. A photodetecting element 14 in the optical reception terminal 12 converts the signal from the optical transmission line 10 into an electric signal and applies it to one input of a comparator 16. A threshold generating circuit 18 generates a threshold Vth for binarizing the output of the photodetecting element 14 and applies it to the other input of the comparator 16. The comparator 16 compares the output of the photodetector 14 and the output Vth of the threshold generating circuit 18 to binarize the output of the photodetecting element 14. A demultiplexing circuit 20 demultiplexes the output of the comparator 16 into n (e.g. n=16) channels and applies binary signals of the respective channels to error correcting circuits 22-1~22-n respectively. The error correcting circuits 22-1~22-n correct errors of the signals from the demultiplexing circuit 20 and apply them to a multiplexer 24 as well as send the number of the errors to a counter 26. Most of the existing error correcting circuits comprise such function for outputting the error number and therefore it is not necessary to provide a particular error correcting circuit for the embodiment. The multiplexer 24 multiplexes the n signals from the error correcting circuits 22-1~22-n on the time domain and supplies them as STM signal to the following circuit (when the optical transmission line 10 is, for instance, an international optical fiber transmission line, the following circuit is a domestic communication network).

The counter 26 sums up the number of the errors from the error correcting circuits 22-1~22-n and applies the total result to a threshold control circuit 28. The output value of the counter 26 represents the Q value of the optical transmission line 10. The threshold control circuit 28 can apply a threshold control signal to the threshold generating circuit 18 in order to change its generating threshold Vth. The threshold control circuit 28 controls the threshold generating circuit 18 to generate a plurality of thresholds one after another, determines an optimum discrimination threshold for the present transmission condition of the optical transmission line 10 from the outputs of the counter 26 corresponding to the respective thresholds, and directs the threshold generating circuit 18 to generate the determined discrimination threshold until the following discrimination threshold is optimized thereafter.

Figure 2:
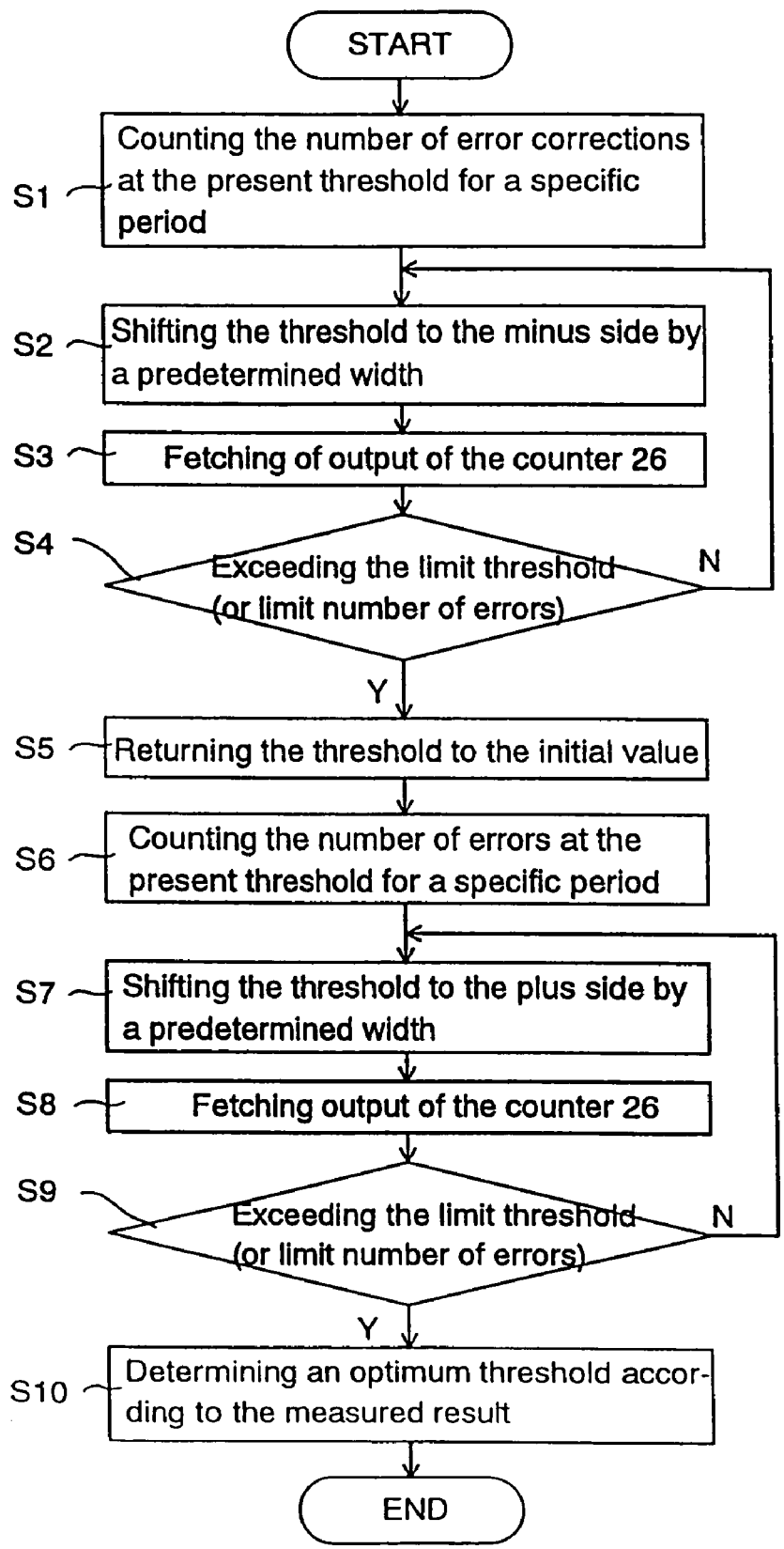
FIG. 2 is an operation flow chart of a threshold control circuit 28.
Figure 3:
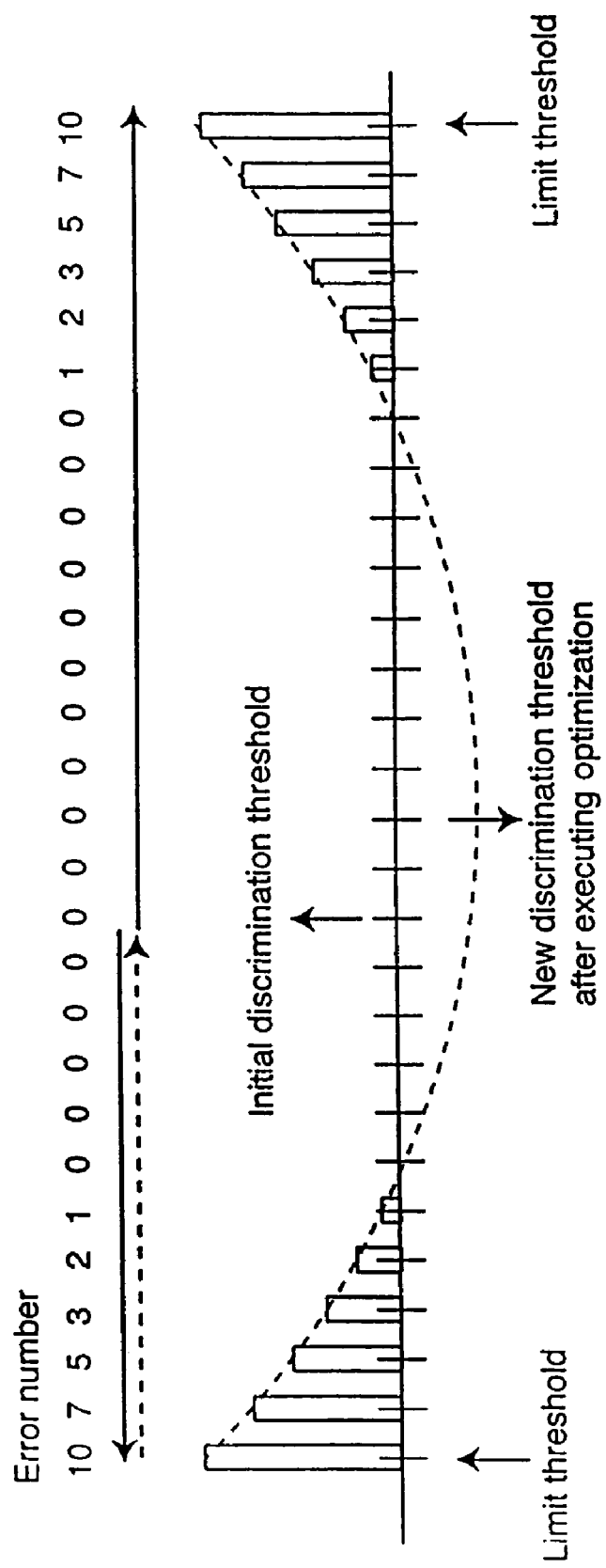
FIG. 3 is a schematic diagram showing a relation between thresholds and the error numbers.

FIG. 2 shows an operation flow chart of the threshold control circuit 28 and FIG. 3 is a schematic diagram showing the relation between the thresholds and the number of the errors. In FIG. 3, the horizontal axis shows the discrimination thresholds and the vertical axis shows the number of the errors as a bar graph.

Figure 4:
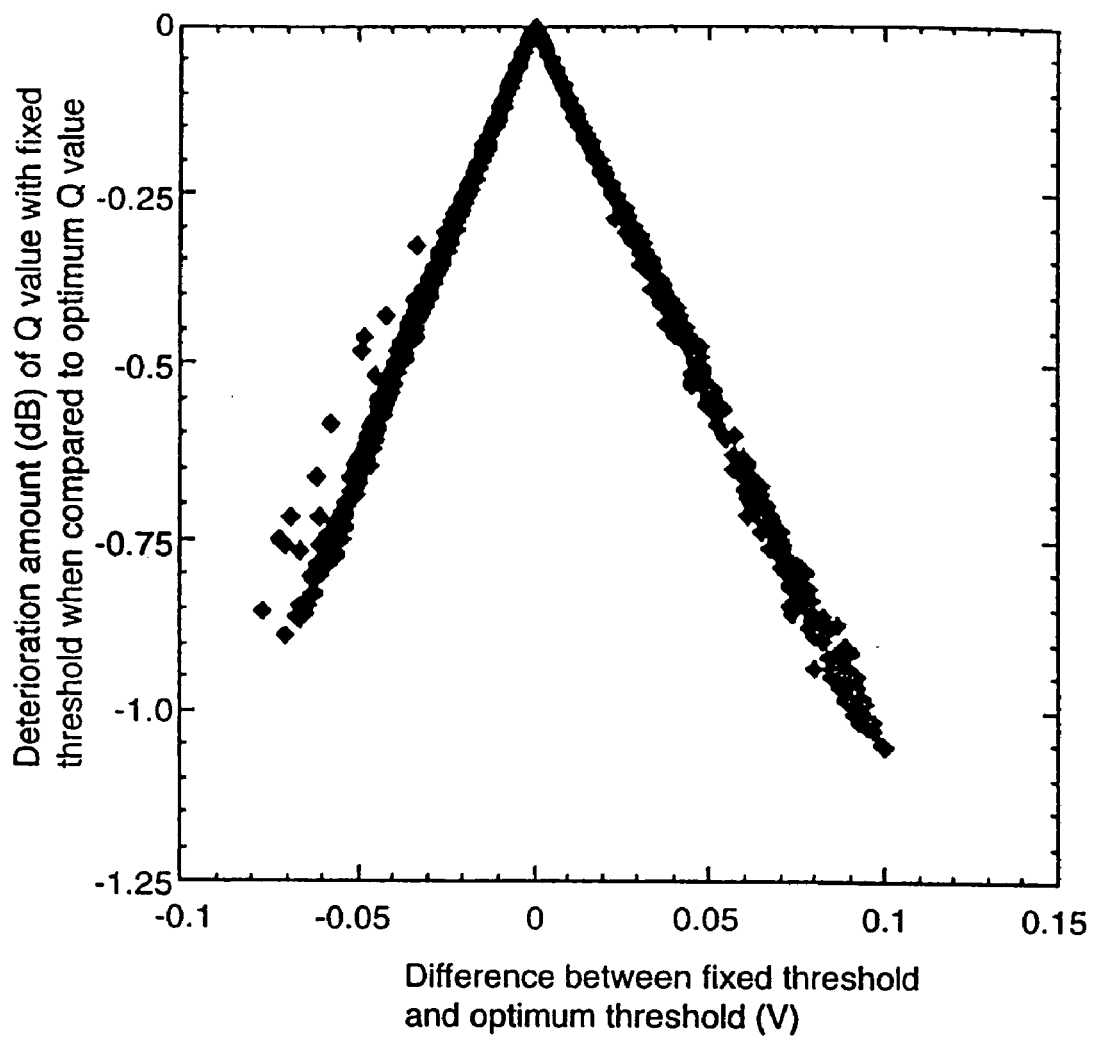
FIG. 4 is a measured example of a Q value variation relative to a threshold variation.

The threshold control circuit 28 fetches the output (the total of the errors of the whole channels) of the counter 26 at the present threshold and stores its average value (S1). Also, the threshold control circuit 28 controls the threshold generating circuit 18 to shift its discrimination threshold toward the minus side by a predetermined value (S2) and fetches the output of the counter 26 at the threshold (S3). The shifting amount of the discrimination threshold at a time can be rough to a certain extent. FIG. 4 is a measured example showing a variation of the Q value relative to a variation of the threshold. In FIG. 4, the horizontal axis shows deviations from the optimum threshold with a volt unit, and the vertical axis shows a deteriorated amount (dB) from the Q value at the optimum threshold. When the discrimination threshold is varied within the width of 10 mV, the deteriorated amount of the Q value becomes no more than 0.1 dB. Therefore, the threshold should be varied every 10 mV to count the number of the errors. After that the shift of the threshold Vth toward the minus side (S2) and the fetch of the output of the counter 26 at the threshold (S3) are repeated until the threshold reaches the limit threshold on the minus side (S4).

When the threshold reaches the limit threshold on the minus side (S4), the threshold control circuit 28 adjusts the threshold to the initial value at S1 (S5), fetches again the output of the counter 26 for a predetermined period and stores its average value (S6). Then, the threshold control circuit 28 stepwisely shifts the threshold Vth toward the plus side (S7), fetches and stores the output of the counter 26 at the respective thresholds (S8) until the threshold Vth reaches the limit threshold on the plus side (S9).

At the point that the threshold Vth on the plus side reaches the limit threshold (S9), the whole information is obtained that contains the number of the errors at the respective thresholds within the range from the limit threshold on the minus side to the limit threshold on the plus side. From the obtained result, the threshold control circuit 28 determines an optimum discrimination threshold to make the number of the errors minimum and controls the threshold generating circuit 18 to generate the determined threshold thereafter (S10).

After the threshold determined at S10 is used for a predetermined period, the flow shown in FIG. 2 is again executed so as to optimize the discrimination threshold.

In FIG. 2, the information of the error number relative to the threshold is measured between both limit thresholds on the minus side and plus side. However, when the error number reaches over the limit value, it is meaningless to vary the threshold any further in the direction to increase the number of the errors. From this point of view, it is obvious that the threshold can be varied within the range in which the number of the errors reaches no more than the limit value at the steps from S4 to S9.

In FIG. 1, to make it easily understandable, the comparator 16 binarizes the signal (the output of the photodetecting element 14) with one threshold. It is obvious, however, that this embodiment is applicable to the case in which thresholds for mark signal and space signal are separately provided. In this case, each threshold should be optimized respectively following the process shown in FIG. 2.

Figure 5:
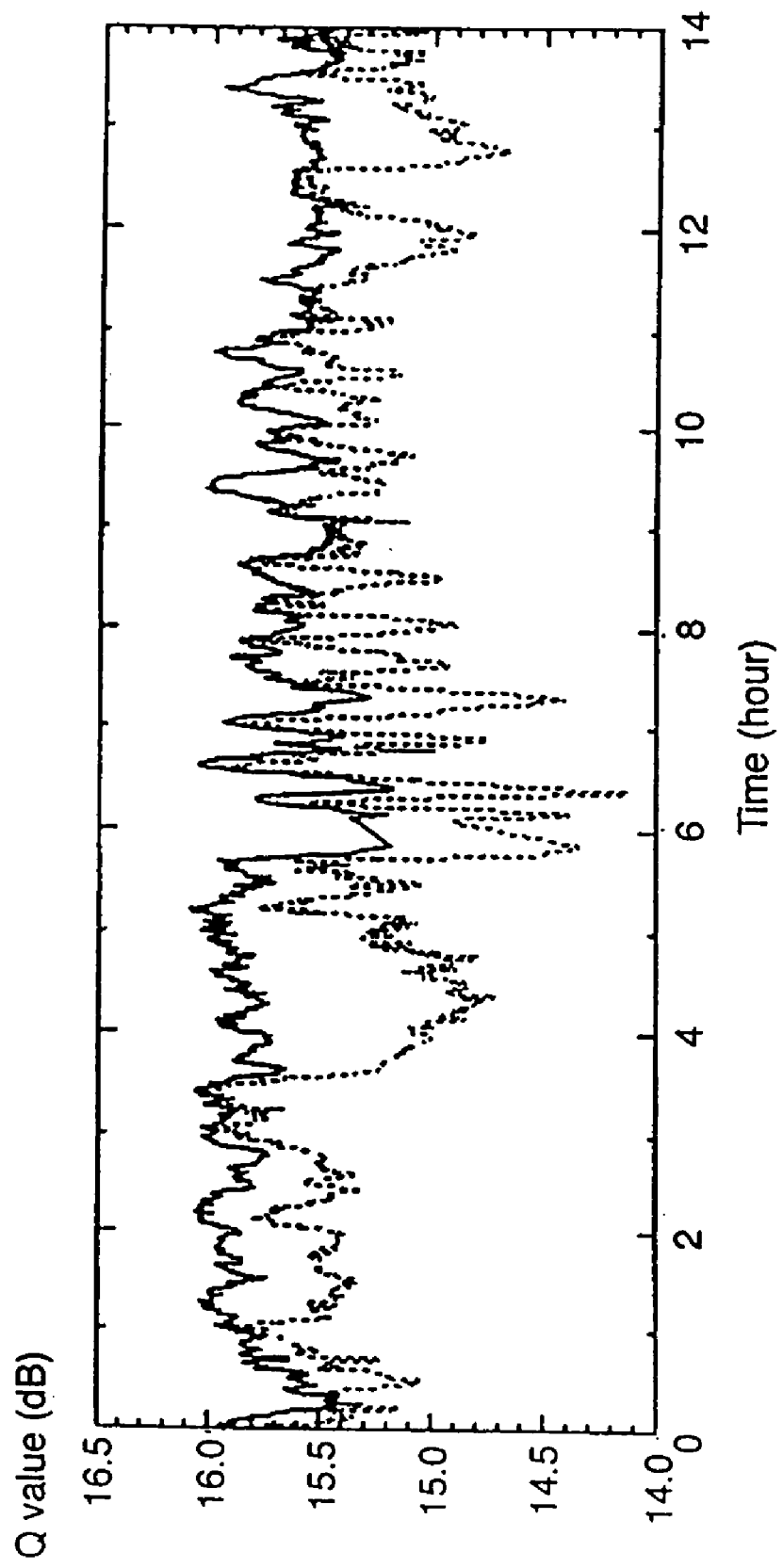
FIG. 5 is an example of measured results of the Q value when a discrimination threshold is suitably controlled according to the embodiment.

FIG. 5 shows a measured result of Q values when a discrimination threshold is adaptively controlled according to the embodiment. The solid line shows the Q values of the embodiment. As a comparative object, the broken line shows Q values when the discrimination threshold is fixed. By comparison between both lines, it is clear that, according to the embodiment, the average Q value can be kept in the higher range.

Figure 6:
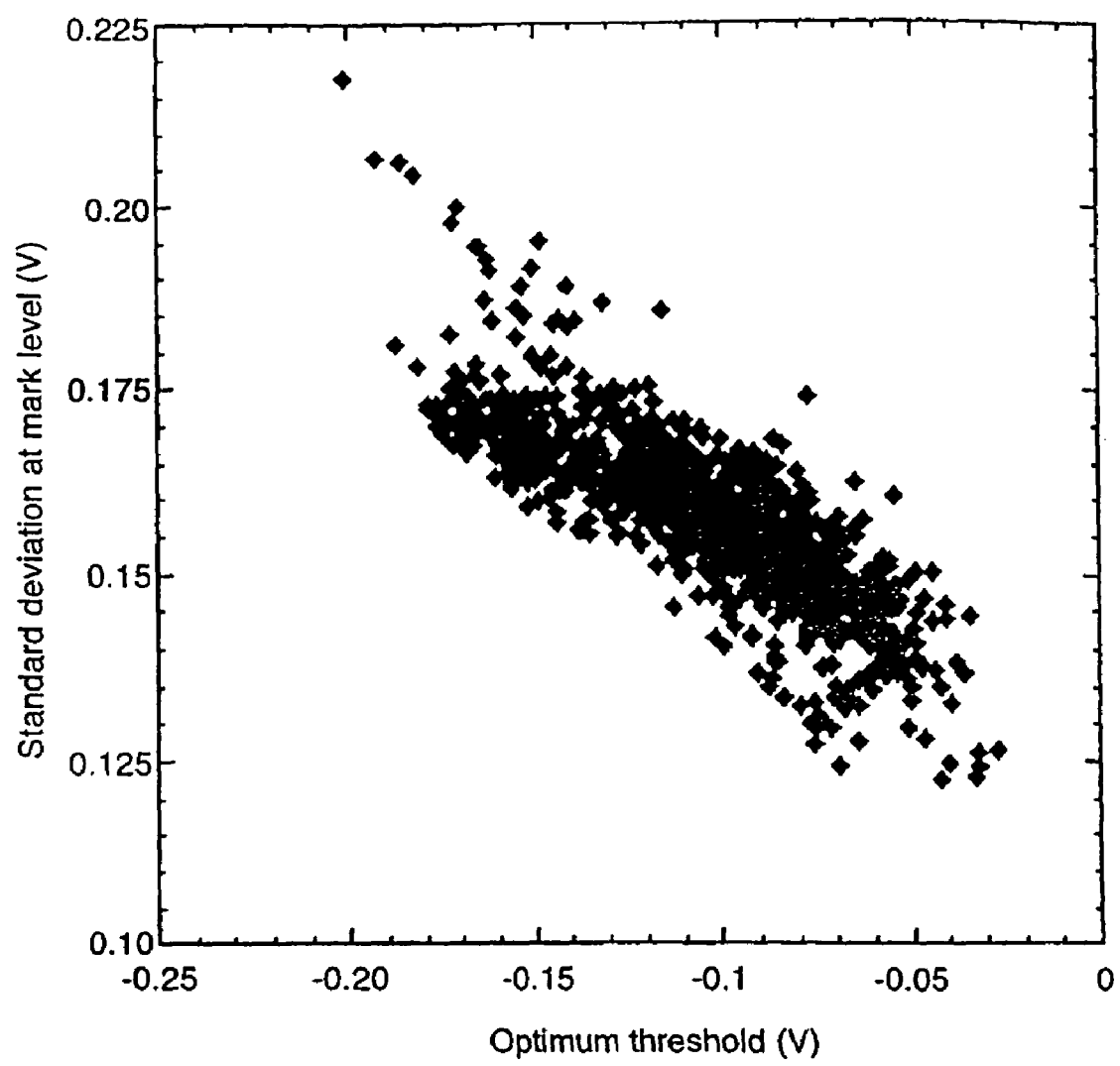
FIG. 6 is a measured example showing a relation between the optimum thresholds and the distribution of signal mark levels.

In the above embodiment, the discrimination threshold is determined so as to minimize the number of the errors. It is possible that an standard deviation of a mark level is measured and then an optimum threshold is determined according to the measured result. This method is also applicable to optimize the discrimination threshold. FIG. 6 illustrates a measured example showing the relation between the optimum thresholds and a distribution of the mark level (standard deviation of the mark level) of the signal light. In FIG. 6, the vertical axis shows the standard deviations of the mark level and the horizontal axis shows the optimum thresholds. In this measured result, the correlation coefficient between the standard deviations of the mark level and the optimum thresholds is 0.82. It is understood from the measured result that the discrimination threshold can be dynamically optimized by feedback-controlling the discrimination threshold according to the measured result of the standard deviations of the mark level.

Figure 7:
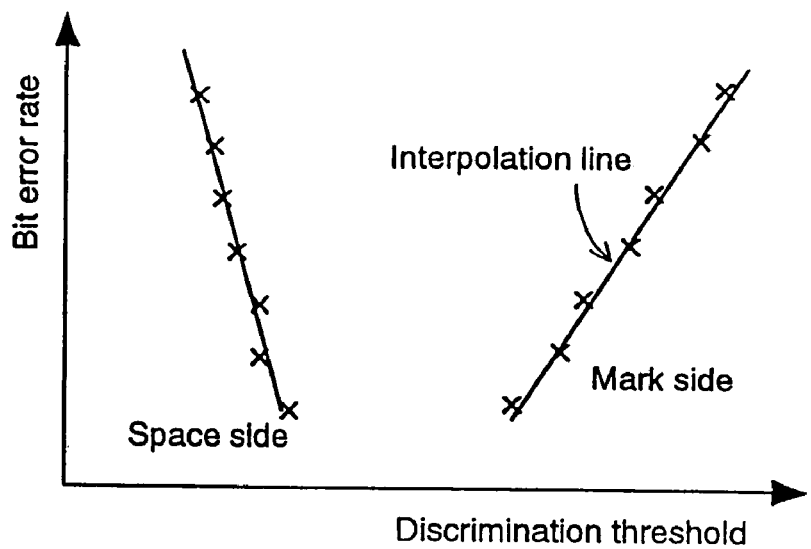
FIG. 7 is a schematic diagram showing a variation of a bit error rate relative to the discrimination thresholds.

In order to find the standard deviation of the mark level, for instance, a method is applicable in which bit error rates are measured while varying discrimination thresholds and then Q values are obtained from the measured result (e.g. N. S. Bergano et al., IEEE Photonics Technology Letters, Vol. 5, pp. 304–306, 1993). When transmission characteristics such as Q value and the like are measured on a mark side (or a space side), bit error rates at respective threshold levels are measured while the discrimination threshold is shifted toward the mark side (or the space side). An optimum threshold can be determined from the variation of the measured result relative to the thresholds. FIG. 7 illustrates a schematic diagram of the variation of the bit error rate relative to the discrimination threshold. The horizontal axis and vertical axis show the discrimination threshold and bit error rate respectively. The crosses show measured points. The inclination of the interpolation line connecting the measured points on the mark side shows the standard deviation of the mark level. Accordingly, when the bit error rates on the mark side corresponding to at least two discrimination thresholds are measured, the standard deviation on the mark side is obtained and thus the discrimination threshold can be optimized.

Figure 8:
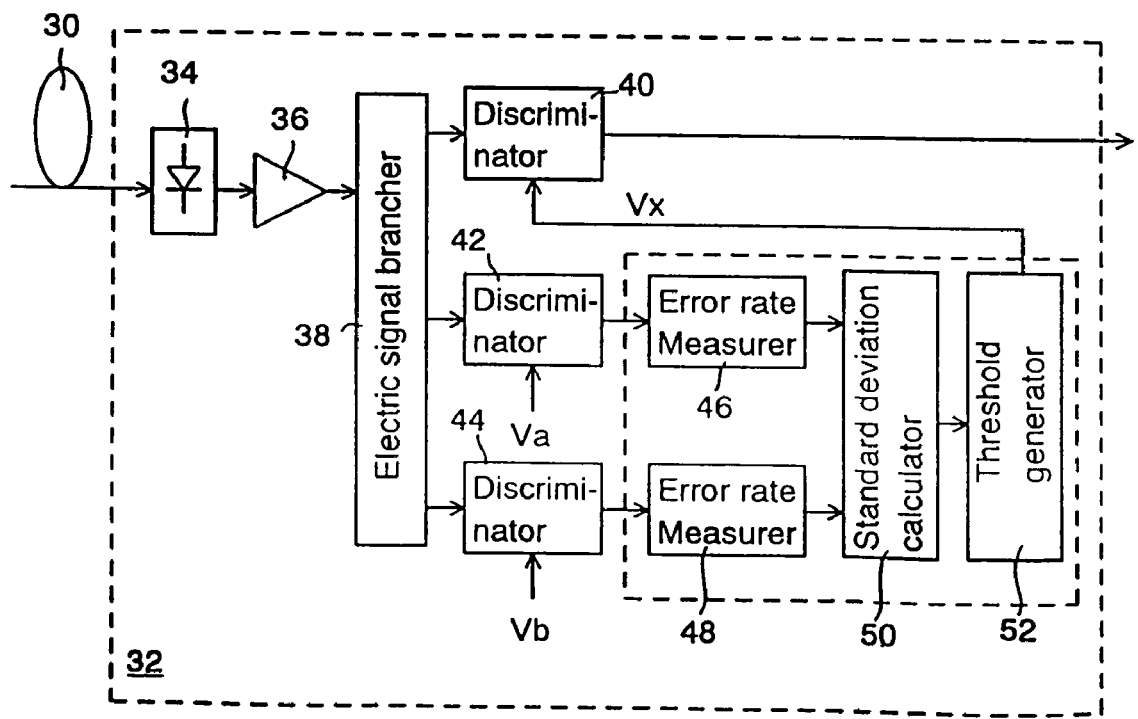
FIG. 8 is a schematic block diagram according to a second embodiment of the invention.
Figure 9:
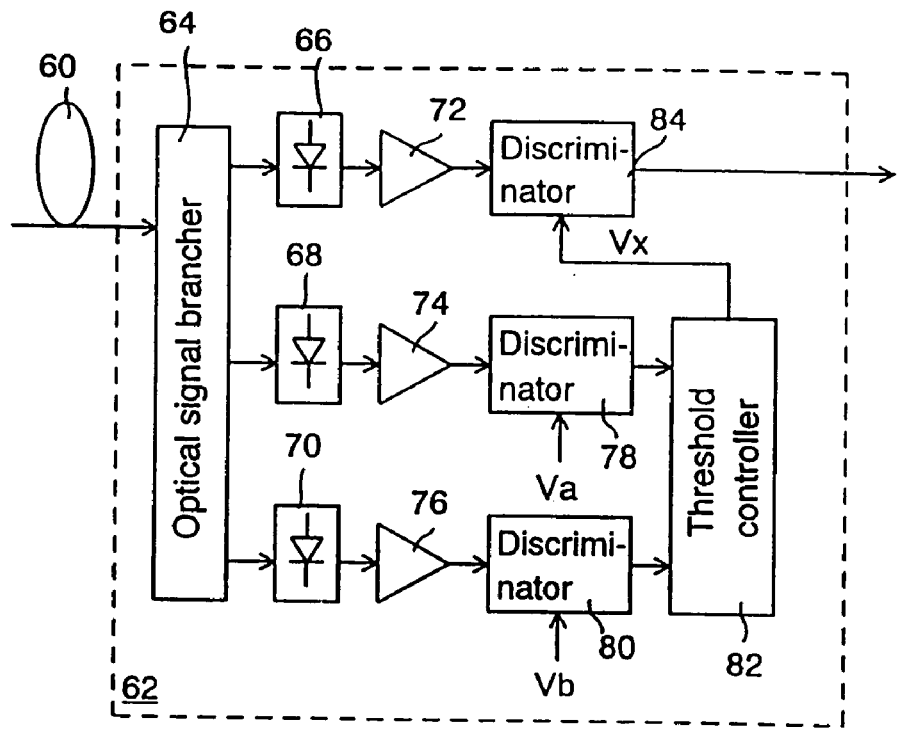
FIG. 9 is a schematic block diagram according to a third embodiment of the invention.
Figure 10:
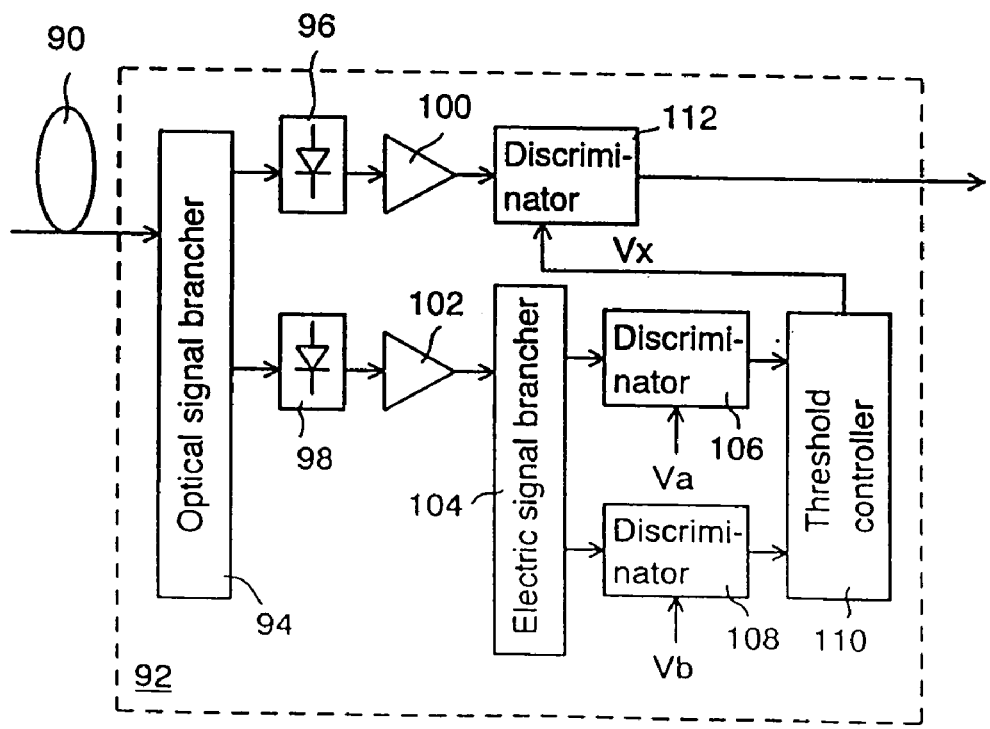
FIG. 10 is a schematic block diagram according to a fourth embodiment of the invention.

Each of FIGS. 8, 9 and 10 shows a schematic block diagram of an embodiment in which the standard deviation on a mark side is measured and the discrimination threshold is optimized according to the measured result. Each of the embodiments in FIGS. 8, 9 and 10 has fundamentally the same operation and function except for a branching step of a received signal.

FIG. 8 is explained first. A signal light enters an optical receiving apparatus 32 according to the invention from an optical transmission line 30. A photodetecting element 34 in the optical receiving apparatus 32 converts the signal light from the optical transmission line 30 into an electrical signal, and a linear amplifier 36 linearly amplifies the output from the photodetector 34. An electric signal branching circuit 38 branches the output of the amplifier 36 into a discriminating circuit 40 having a variable threshold and discriminating circuits 42, 44 respectively having fixed thresholds Va, Vb. The branching circuit 38 can be either one that simultaneously applies the output of the amplifier 36 to the discriminating circuits 40, 42 and 44 or that applies the output of the amplifier 36 to the discriminating circuits 42 and 44 when an optimum threshold is determined and applies the output of the amplifier 36 to the discriminating circuit 40 for the rest of the period. From the point of view of constant signal reception, the former configuration is obviously preferable.

The discriminating circuits 42 and 44 discriminate the input signals according to the fixed thresholds Va and Vb respectively. Error rate measuring circuits 46 and 48 measure bit error rates of the outputs from the discriminating circuits 42 and 44 and apply the measured results to a standard deviation calculating circuit 50. The values of the thresholds Va and Vb are respectively preset so as to be able to measure bit error rates of two points required for calculating a standard deviation on the mark side. It is also applicable to calculate a standard deviation on the space side instead of that on the mark side. In optical pulse transmission, however, the standard deviation on the mark side can grasp the condition of the transmission line more accurately.

The standard deviation calculating circuit 50 calculates the standard deviation on the mark side from the measured results of the error rate measuring circuits 46 and 48. A threshold generating circuit 52 determines an optimum discrimination threshold by comparing the standard deviation calculated by the standard deviation calculating circuit 50 with the premeasured relation between the standard deviation and optimum threshold, and applies the optimum threshold Vx to the discriminating circuit 40. The discriminating circuit 40 discriminates the signal from the electric signal branching circuit 38 according to the threshold Vx from the threshold generating circuit 52. The signal discriminated at the discriminating circuit 40 is applied to the following circuit as a received signal.

The part consisting of the error rate measuring circuits 46 and 48, standard deviation calculating circuit 50 and threshold generating circuit 52 can be realized with digital arithmetic circuits such as a microcomputer and the like. The discriminating circuits 42 and 44 also can be included in the digital arithmetic circuit.

As readily understandable from the above description, the branching circuit 38 usually applies the output of the amplifier 36 to the discriminating circuit 40 and applies to the discriminating circuits 42 and 44 only when a new optimum discrimination threshold is to be determined. Needless to say, the branching circuit 38 can steadily apply the output of the amplifier 36 to all of the discriminating circuits 40, 42 and 44.

As discussed above, in the embodiment shown in FIG. 8, the error rate, namely the standard deviation on the mark side is measured intermittently or constantly according to more than one fixed threshold. Then, the optimum discrimination threshold is determined from the measured result and the received signal is discriminated according to the optimum discrimination threshold. Therefore, in the embodiment, since the discrimination threshold of the received signal is varied according to the variation of the transmission condition, the receiving condition is always maintained to be most suitable.

In the embodiment shown in FIG. 8, although the received signal is branched in the electric stage by the electric signal branching circuit 38, it is also applicable to branch the received signal in the optical stage. FIG. 9 illustrates a schematic block diagram of such embodiment for branching the signal in the optical stage.

A signal light inputs to an optical receiving apparatus 62 according to the invention from an optical transmission line 60. An optical signal branching circuit 64 in the optical receiving apparatus 62 branches (switches or divides) the signal light from the optical transmission line 60 and applies it to photodetecting elements 66, 68 and 70. The branching function of the optical signal branching circuit 64 can be the same with that of the electric signal branching circuit 38. The photodetecting elements 66, 68 and 70 respectively convert the signals from the branching circuit 64 into electric signals. Linear amplifiers 72, 74 and 76 respectively linearly amplify the outputs from the photodetectors 66, 68 and 70.

Discriminating circuits 78 and 80 respectively discriminate the output signals from the amplifiers 74 and 76 according to fixed thresholds Va and Vb and apply the results to a threshold control circuit 82. The threshold control circuit 82 comprises the same configuration with the part consisted of the error rate measuring circuits 46 and 48, standard deviation arithmetic circuit 50 and threshold generating circuit 52 of the embodiment shown in FIG. 8. That is, the threshold control circuit 82 calculates bit error rates from the outputs (the signal discriminated results according to the two different thresholds Va and Vb) of the discriminating circuits 78 and 80, calculates a standard deviation on the mark side from the obtained bit error rates, and determines an optimum discrimination threshold from the standard deviation on the mark side. The threshold control circuit 82 then applies the determined optimum discrimination threshold Vx to a discriminating circuit 84.

The discriminating circuit 84 discriminates the output signal of the linear amplifier 72 according to the discrimination threshold Vx from the threshold control circuit 82. The signal discriminated at the discriminating circuit 84 is applied to the following circuit as a received signal.

FIG. 10 is a schematic block diagram of an embodiment combining the branching in the optical stage and in the electric stage.

A signal light enters an optical receiving apparatus 92 according to the invention from an optical transmission line 90. An optical signal branching circuit 94 in the optical receiving apparatus 92 branches (switches or divides) the signal light from the optical transmission line 90 and applies it to photodetecting elements 96 and 98. The optical signal branching circuit 94 can be either one that selectively applies the signal light from the optical transmission line 90 to the photodetecting element 96 or 98 or that divides the signal light into two portions and applies them to the photodetecting elements 96 and 98 simultaneously. From the point of view of continuous signal reception, the latter is more preferable. The photodetecting elements 96 and 98 respectively convert the signal lights from the branching circuit 94 into electric signals. Linear amplifiers 100 and 102 linearly amplify the outputs from the photodetecting elements 96 and 98 respectively.

An electric signal branching circuit 104 simultaneously applies the output signal from the linear amplifier 102 to discriminating circuits 106 and 108 respectively having fixed thresholds Va and Vb. The discriminating circuits 106 and 108 respectively discriminate the signals from the electric signal branching circuit 104 according to the fixed thresholds Va and Vb, and apply the results to a threshold control circuit 110. The threshold control circuit 110 has the same configuration and operation with the threshold control circuit 82. Namely, the threshold control circuit 110 calculates bit error rates from the outputs (the signal discriminated results according to the two different thresholds Va and Vb) of the discriminating circuits 106 and 108, calculates a standard deviation on a mark side from the obtained bit error rates, and determines an optimum discrimination threshold from the standard deviation on the mark side. Then, the threshold control circuit 110 applies the determined optimum discrimination threshold Vx to a discriminating circuit 112.

The discriminating circuit 112 discriminates the output signal from the linear amplifier 100 according to the discrimination threshold Vx from the threshold control circuit 110. The signal discriminated at the discriminating circuit 112 is applied to the following circuit as a received signal.

As a simpler method, bit error rates on both mark side and space side are measured, and an optimum discrimination threshold is estimated from the variation of the measured values. On the assumption that variation slopes of the bit error rates on the mark and space sides relative to the discrimination thresholds are constant respectively, the optimum discrimination threshold can be determined with a simpler configuration since it is sufficient if only one bit error rate is measured on each of the mark and space sides. When the bit error rates are measured according to a plurality of discrimination thresholds on the mark and space sides respectively, variation slopes of the bit error rates on the mark and space sides relative to the discrimination thresholds can be measured dynamically. Therefore, it is obvious that the discrimination threshold can be optimized more accurately.

Figure 11:
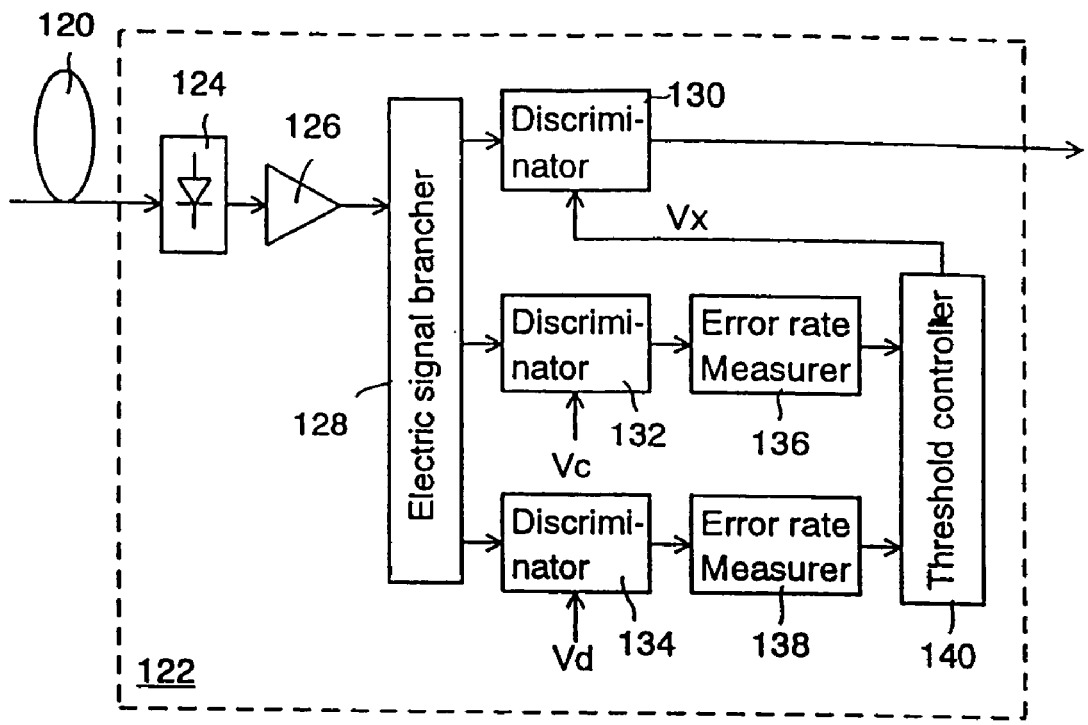
FIG. 11 is a schematic block diagram according to a fifth embodiment of the invention.

FIG. 11 illustrates a schematic block diagram of an embodiment for optimizing a discrimination threshold according to bit error rates on the mark and space sides.

A signal light enters an optical receiving apparatus 122 according to the invention from an optical transmission line 120. A photodetecting element 124 in the optical receiving apparatus 122 converts the signal light from the optical transmission line 120 into an electric signal, and a linear amplifier 126 linearly amplifies the output from the photodetecting element 124. An electric signal branching circuit 128 branches an output from the amplifier 126 to a discriminating circuit 130 with a variable threshold, and discriminating circuits 132, 134 with fixed thresholds Vc, Vd respectively. The branching circuit 128 comprises the same function with the branching circuit 38.

The discriminating circuit 132 discriminates marks in the input signal according to the fixed threshold Vc for the mark. The discriminating circuit 134 discriminates spaces of the input signal according to the fixed threshold Vd for the space. The threshold Vc is set higher than a standard discrimination threshold for discriminating a binary signal, and the threshold Vd is set, in reverse, lower than the standard discrimination threshold. An error rate measuring circuit 136 calculates the bit error rate on the mark side from the output of the discriminating circuit 132, and an error rate measuring circuit 138 calculates the bit error rate on the space side from the output of the discriminating circuit 134. The measured results of the error rate measuring circuits 136 and 138 are applied to a threshold control circuit 140. The threshold control circuit 140 determines an optimum discrimination threshold Vx from the bit error rates on the mark and space sides measured by the error rate measuring circuits 136 and 138, and applies it to the discriminating circuit 130.

The discriminating circuit 130 discriminates the signal from the electric signal branching circuit 128 according to the threshold Vx from the threshold control circuit 140. The signal discriminated at the discriminating circuit 130 is applied to the following circuit as a received signal.

Figure 12:
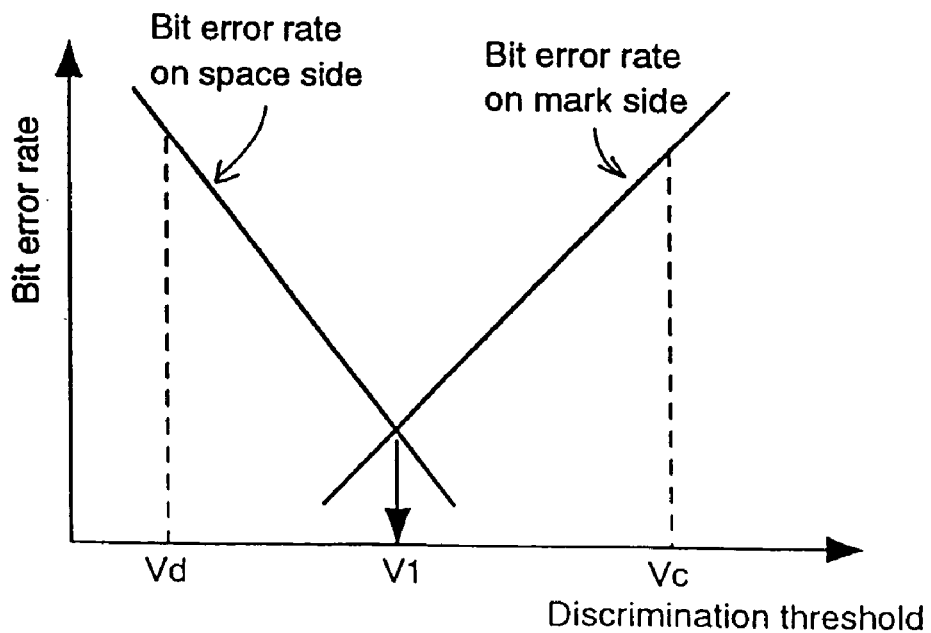
FIG. 12 is a schematic diagram showing a variation of the bit error rate relative to the discrimination thresholds.
Figure 13:
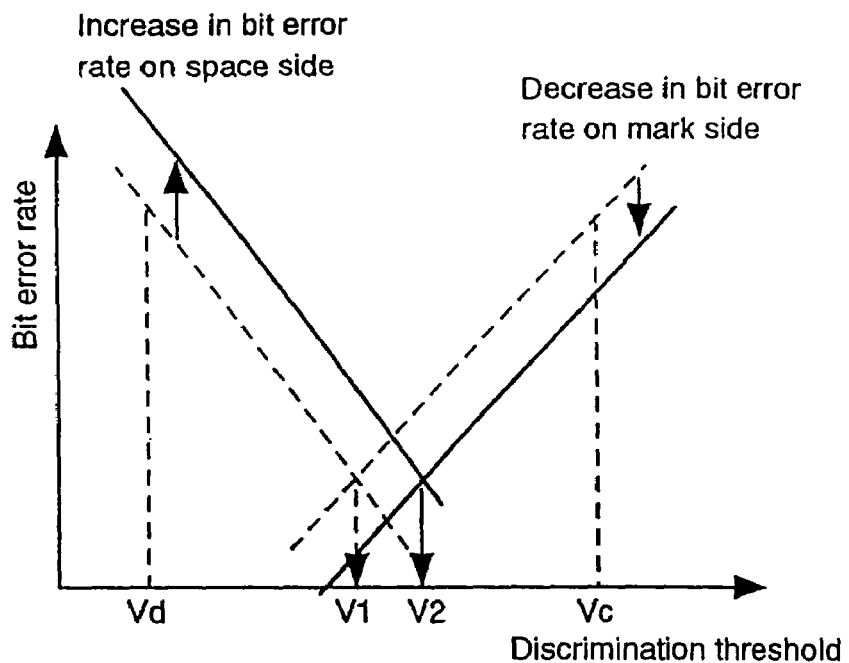
FIG. 13 is a schematic diagram showing a variation of the bit error rate relative to the discrimination thresholds in a state that the bit error rate on a space side is increased.
Figure 14:
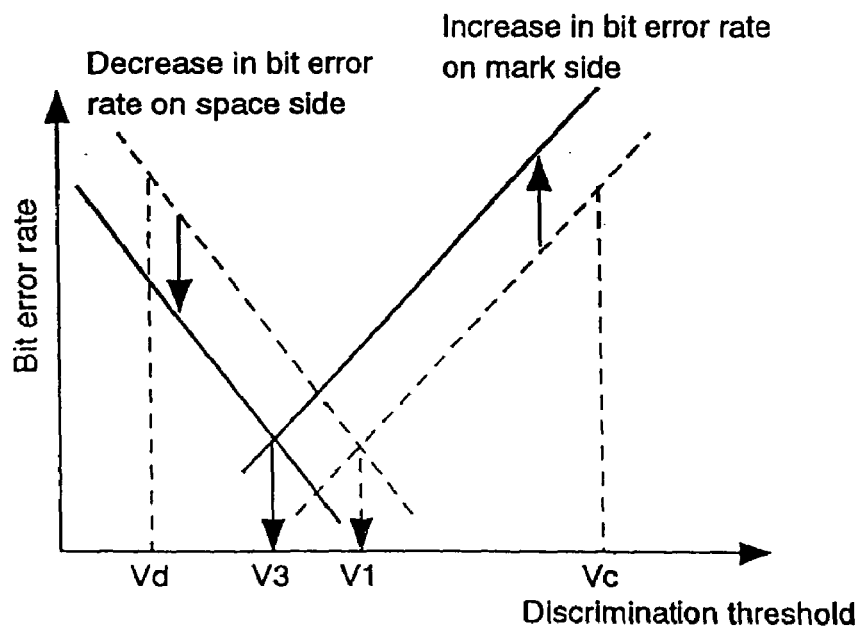
FIG. 14 is a schematic diagram showing a variation of the bit error rate relative to the discrimination thresholds in a state that the bit error rate on a mark side is increased.

The decision mechanism of the optimum threshold Vx at the threshold control circuit 140 is explained below referring to FIGS. 12, 13 and 14. FIGS. 12, 13 and 14 show variations of the bit error rate relative to the discrimination thresholds. FIG. 12 shows an initial state, FIG. 13 shows a state in which the bit error rate on the space side is increased compared to the initial state shown in FIG. 12, and FIG. 14 shows, inversely, a state in which the bit error rate on the mark side is increased compared to the initial state shown in FIG. 12 respectively. In FIGS. 12, 13 and 14, the horizontal axis shows the discrimination thresholds and the vertical axis shows the bit error rates.

In the initial state shown in FIG. 12, the discrimination threshold V1, corresponding to the intersection point of the straight line representing the bit error rates on the mark side and that representing the bit error rates on the space side, indicates the optimum discrimination threshold Vx. When the inclinations of the two straight lines showing the bit error rates on the mark and space sides are already known, the discrimination threshold V1 corresponding to the intersection point is easily calculated by measuring the bit error rate on the mark side according to the threshold Vc and the bit error rate on the space side according to the threshold Vd, as shown in the embodiment of FIG. 11. When the inclination variation of the bit error rate relative to the discrimination threshold is not negligible or a more precise optimum discrimination threshold is desired, it is obvious that the bit error rates on both mark and space sides should be measured according to a plurality of discrimination.

When the bit error rate on the space side is increased from the initial state shown in FIG. 12, the threshold V2 corresponding to the intersection point of the two straight lines of the bit error rates on the mark and space sides moves to the right direction compared to the threshold V1 as shown in FIG. 13. Accordingly, the threshold control circuit 140 applies the discrimination threshold V2 as a new optimum discrimination threshold Vx to the discriminating circuit 130.

Contrarily, when the bit error rate on the mark side is increased from the initial state shown in FIG. 12, the threshold V3 corresponding to the intersection point of the two straight lines of the bit error rates on the mark and space sides moves to the left direction compared to the threshold V1 as shown in FIG. 14. Accordingly, the threshold control circuit 140 applies the discrimination threshold V3 as a new optimum discrimination threshold Vx to the discriminating circuit 130.

As described above, in the embodiment shown in FIG. 11, the discrimination threshold is optimized adaptively according to the condition of the transmission line with the simple configuration, and therefore the receiving condition is maintained at the optimum state.

In the same way that the embodiment shown in FIG. 8 is modified to the embodiments shown in FIGS. 9 and 10, the embodiment shown in FIG. 11 also obtain the equivalent operating effect when it is modified to a configuration that the signal is branched in an optical stage and/or an electric stage.

Figure 15:
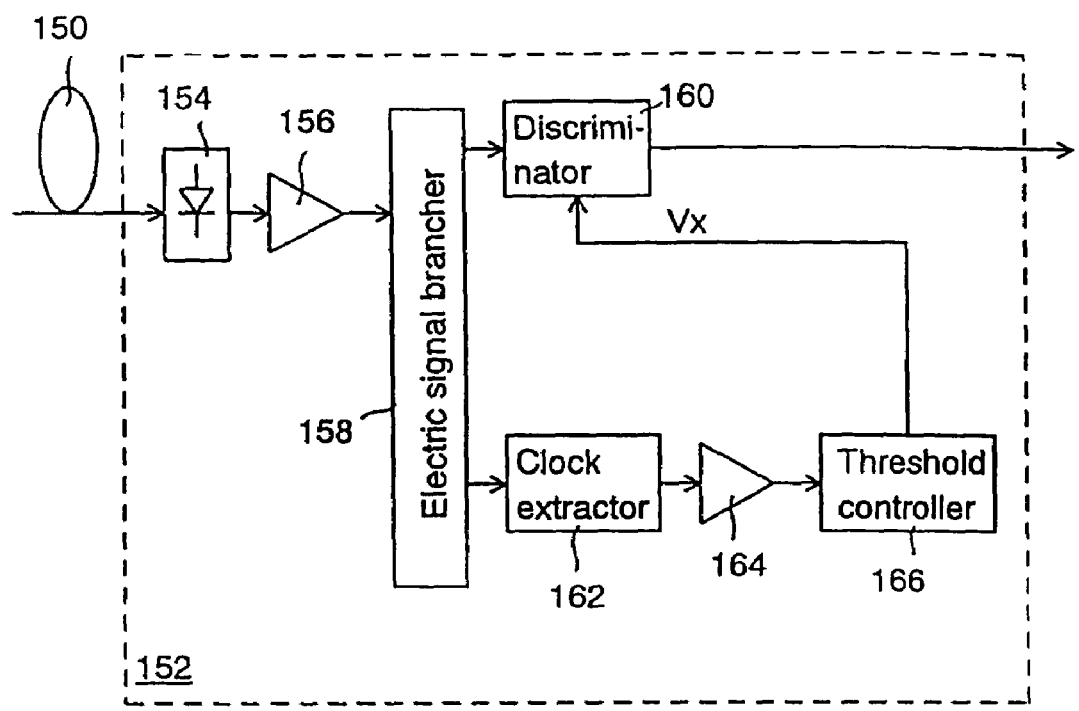
FIG. 15 is a schematic block diagram according to a sixth embodiment of the invention.

FIG. 15 shows a schematic block diagram of an embodiment for optimizing a discrimination threshold with amplitude of a clock signal reproduced from a received signal.

A signal light enters an optical receiving apparatus 152 according to the invention from an optical transmission line 150. A photodetecting element 154 in the optical receiving apparatus 152 converts the signal light from the optical transmission line 150 into an electric signal, and a linear amplifier 156 linearly amplifies the output from the photodetecting element 154. An electric signal branching circuit 158 branches the output from the amplifier 156 to a discriminating circuit 160 with a variable threshold and clock extracting circuit 162. The branching circuit 158, similarly to the branching circuits 38 and 128, can be either one that simultaneously applies the output of the amplifier 156 to the discriminating circuit 160 and clock extracting circuit 162 or that selectively applies the output to the discriminating circuit 160 or the clock extracting circuit 162. From a viewpoint of continuity of signal receiving, the former function is more preferable.

The clock extracting circuit 162 extracts a clock out of the signal from the branching circuit 158. In a standard optical receiving apparatus, a limiting amplifier is employed in order to control the amplitude of the clock signal to be constant. However, the embodiment uses the linear amplifier 156, and therefore the clock extracting circuit 162 can obtain the clock signal having the amplitude according to a waveform of a received signal light.

The clock signal extracted at the clock extracting circuit 162 is linearly amplified by a linear amplifier 164 and applied to a threshold control circuit 166. The threshold control circuit 166 controls the discrimination threshold of the discriminating circuit 160 at the optimum value Vx according to the amplitude of the clock signal from the linear amplifier 164. That is, as shown in FIG. 14, when noise on the mark side is large, the optimum threshold moves to the space side and at the same time the amplitude of the clock decreases due to the influence of the noise. In reverse, when the noise on the mark side is small, the optimum threshold moves to the mark side and at the same time the amplitude of the clock increases due to the influence of the noise. The threshold control circuit 166 is preprogrammed with the information to indicate such relations between the clock amplitude and the optimum threshold, thus determining an optimum threshold Vx by comparing the amplitude (clock amplitude) of the output from the linear amplifier 164 with this information, and applies it to the discriminating circuit 160.

The discriminating circuit 160 discriminates the signal from the electric signal branching circuit 158 according to the threshold Vx from the threshold control circuit 166. The signal discriminated at the discriminating circuit 160 is applied to the following circuit as a received signal.

Figure 16:
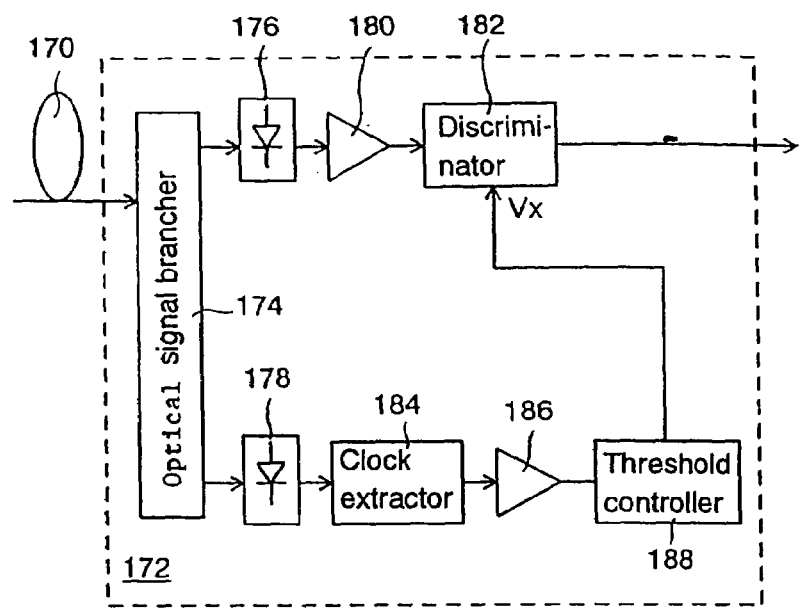
FIG. 16 is a schematic block diagram according to a seventh embodiment of the invention.

FIG. 16 shows a schematic block diagram of an embodiment in which the embodiment shown in FIG. 15 is modified so that the signal is branched in the optical stage instead of in the electric stage.

A signal light enters an optical receiving apparatus 172 according to the invention from an optical transmission line 170. An optical signal branching circuit 174 in the optical receiving apparatus 172 branches (switches or divides) the signal light from the optical transmission line 170 and applies it to photodetecting elements 176 and 178. The branching function of the optical signal branching circuit 174 is similar to that of the electric signal branching circuit 158. The photodetecting circuits 176 and 178 respectively convert the signal light from the branching circuit 174 into an electric signal. A linear amplifier 180 linearly amplifies the output from the photodetecting element 176 and applies it to a discriminating circuit 182.

Similarly to the clock extracting circuit 162, a clock extracting circuit 184 extracts a clock from the output of the photodetecting element 178. Similarly to the case shown in FIG. 15, the amplitude of the clock output from the clock extracting circuit 184 reflects the noise condition of the optical transmission line 170.

A linear amplifier 186 linearly amplifies the clock signal extracted at the clock extracting circuit 184 and applies it to a threshold control circuit 188. The threshold control circuit 188, similarly to the threshold control circuit 166, controls the discrimination threshold of the discriminating circuit 182 to an optimum value Vx according to the amplitude of the clock signal from the linear amplifier 186.

The discriminating circuit 182 discriminates the output from the linear amplifier 180 according to the threshold Vx from the threshold control circuit 188. The signal discriminated at the discriminating circuit 182 is applied to the following circuit as a received signal.

Figure 17:
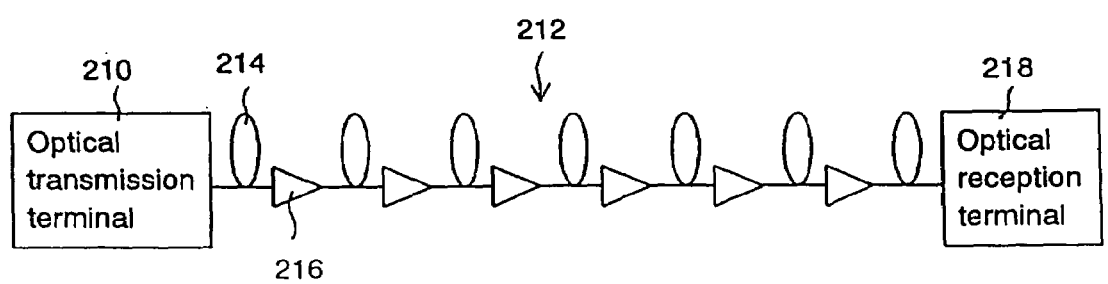
FIG. 17 is a schematic block diagram of an optical transmission system in which the optical receiving apparatus of the above-mentioned respective embodiments is disposed at a receiving station.
Figure 18:
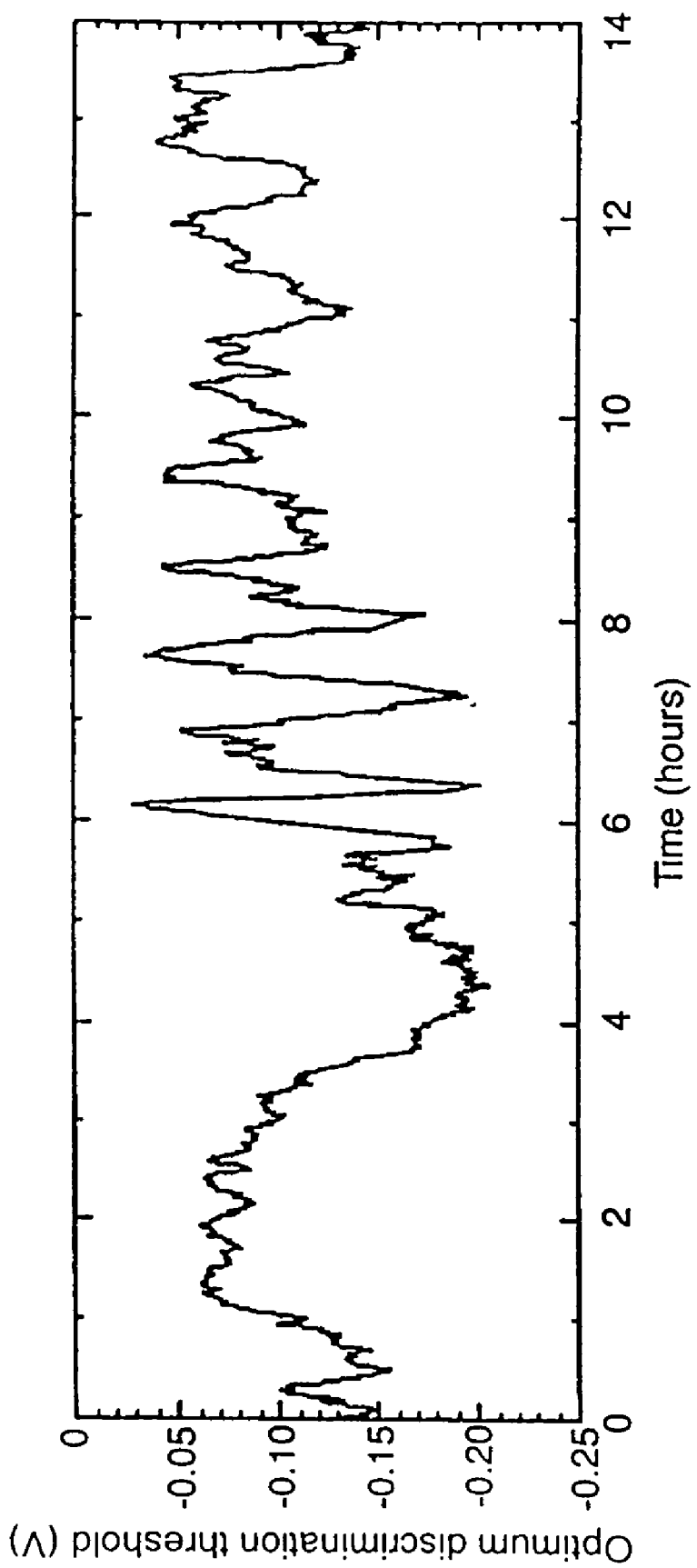
FIG. 18 is a measured result of a time variation of the optimum discrimination threshold.

FIG. 17 shows a schematic block diagram of an optical transmission system in which the optical receiving apparatus of the above-discussed embodiments is employed as a reception terminal. An optical transmission terminal 210 outputs an optical signal onto an optical transmission line 212. The optical transmission line 212 comprises a number of optical fibers 214 and optical amplification repeaters 216 for connecting those optical fibers 214 in serial. The signal light propagated on the optical transmission line 212 enters an optical reception terminal 218. The optical reception terminal 218 having the above-mentioned built-in optical receiving apparatus adaptively optimizes the discrimination threshold of the signal according to the transmission condition of the optical transmission line 212 and discriminates the received signal. Accordingly, the most suitable discrimination threshold is selected according to the time variation of the transmission characteristics on the optical transmission line and therefore the satisfactory signal receiving performance is also maintained.

Figure 19:
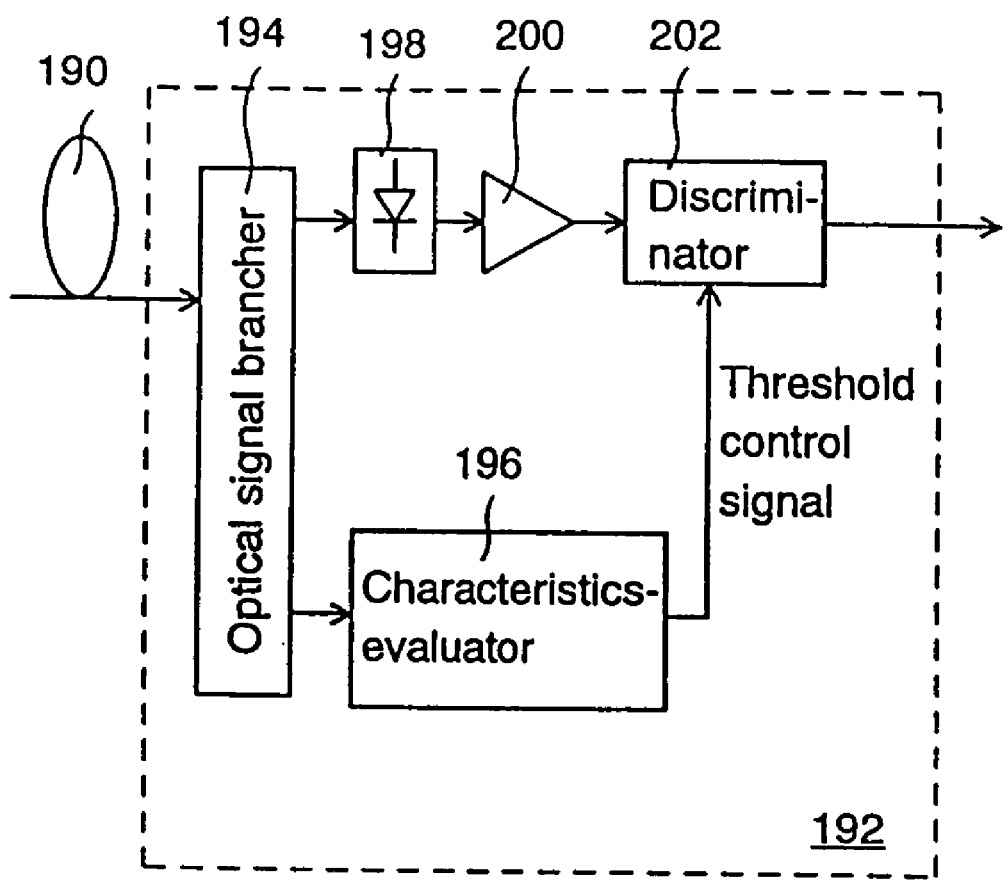
FIG. 19 is a schematic block diagram of an embodiment to evaluate transmission characteristics in an optical circuit.

In the above embodiment, although the transmission characteristics are finally evaluated with the electric signal, it is also applicable to evaluate them in the optical state. FIG. 19 shows a schematic block diagram of such embodiment.

In FIG. 19, a signal light enters an optical receiving apparatus 192 according to the invention from an optical transmission line 190. An optical signal branching circuit 194 in the optical receiving apparatus 192 branches (switches or divides) the signal light from the optical transmission line 190 and applies it to a characteristics-evaluating optical circuit 196 and photodetecting element 198. The branching function of the optical signal branching circuit 194 may be the same as that of the signal branching circuits 158 and 174. The characteristics-evaluating optical circuit 196 generates a discrimination threshold control signal for determining a discrimination threshold of a received signal out of the input signal light from the optical signal branching circuit 194. The photodetecting element 198 converts the signal light from the branching circuit 194 into an electric signal. A linear amplifier 200 linearly amplifies the output of the photodetecting element 198 and applies it to a discriminating circuit 202 having a variable threshold. The discriminating circuit 202 discriminates the output signal from the linear amplifier 200 with a discrimination threshold according to the discrimination threshold control signal from the characteristics-evaluating optical circuit 196. The signal discriminated at the discriminating circuit 202 is applied to the following circuit as a received signal.

The characteristics-evaluating optical circuit 196 comprises, for instance, a saturable absorber. The saturable absorber is an element that absorbs weak input light and also transmits intense input light without absorbing. Considering that the amplitude variation of the optical signal affects the optimum discrimination threshold, it is possible to obtain the information for determining the discrimination threshold from the optical signal transmitted through the saturable absorber. Namely, when the output light of the saturable absorber is weak, it is considered that the amplitude of the optical signal is small, and thus the discrimination threshold should be moved toward the space side. In reverse, when the output light of the saturable absorber is intense, it is considered that the amplitude of the optical signal is large, and thus the discrimination threshold should be moved toward the mark side. In this way, the discriminating threshold may be determined from the transmitted light out of the saturable absorber. Thus, the transmission characteristics are evaluated in the optical stage, and the discrimination threshold of the received signal can be feedforward-controlled according to the evaluated result.

As readily understandable from the above explanation, according to the invention, a signal can be received in an optimum state regardless of a variation of transmission characteristics.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical receiving apparatus, comprising:
   a signal brancher for branching an optical input signal received from an optical transmission line into a first signal component and a second signal component;
   a clock extractor for extracting a clock having an amplitude from the second signal component;
   a discriminator for discriminating the first signal component; and
   a threshold controller for generating a discrimination threshold for the discriminator according to a relationship between the extracted clock amplitude and a bit error rate to which the extracted clock amplitude corresponds.

2. The optical receiving apparatus of claim 1, further comprising a photodetector coupled before the signal brancher for converting the optical input signal to an electrical input signal, wherein the signal brancher branches the electrical input signal from the photodetector into the first signal component and the second signal component.

3. The optical receiving apparatus of claim 2, further comprising a first linear amplifier electrically coupled between the photodetector and the signal brancher for amplifying the electrical input signal.

4. The optical receiving apparatus of claim 2, further comprising a second linear amplifier electrically coupled between the clock extractor and the threshold controller for amplifying the extracted clock.

5. The optical receiving apparatus of claim 1, further comprising a first photodetector for converting the first signal component into a first electrical signal to be input to the discriminator, and a second photodetector for converting the second signal component into a second electrical signal to be input to the clock extractor.

6. The optical receiving apparatus of claim 5, further comprising a first linear amplifier electrically coupled between the first photodetector and the discriminator for amplifying the first electrical signal from the first photodetector.

7. The optical receiving apparatus of claim 5, further comprising a second linear amplifier electrically coupled between the clock extractor and the threshold controller for amplifying the extracted clock.

* * * * *